(12) United States Patent  (10) Patent No.: US 8,727,096 B2
Schroader  (45) Date of Patent: May 20, 2014

(54) SHOE SORTER CONVEYOR SWITCH AND METHOD

(75) Inventor: Steven Vann Schroader, Louisville, KY (US)

(73) Assignee: Cinetic Sorting Corp., Louisville, KY (US)

( * ) Notice: Subject to any disclaimer, the term of this patent is extended or adjusted under 35 U.S.C. 154(b) by 198 days.

(21) Appl. No.: 13/408,273

(22) Filed: Feb. 29, 2012

(65) Prior Publication Data

US 2013/0220771 A1 Aug. 29, 2013

(51) Int. Cl.
*B65G 47/46* (2006.01)
(52) U.S. Cl.
USPC ............ 198/370.01; 198/370.02; 198/370.07; 29/464
(58) Field of Classification Search
USPC ................... 198/370.1, 370.2, 370.3, 370.07; 29/464, 466, 469
See application file for complete search history.

(56) References Cited

U.S. PATENT DOCUMENTS

| | | | |
|---|---|---|---|
| 4,738,347 A | 4/1988 | Brouwer et al. | |
| 5,333,715 A | 8/1994 | Sapp | |
| 5,613,591 A | 3/1997 | Heit et al. | |
| 5,713,118 A * | 2/1998 | Swann et al. | 29/283 |
| 6,098,787 A | 8/2000 | Murano | |
| 6,390,274 B1 * | 5/2002 | Snedecor | 198/370.02 |
| 6,615,972 B2 * | 9/2003 | Veit et al. | 198/370.02 |
| 6,860,376 B1 * | 3/2005 | Heit et al. | 198/370.02 |
| 6,910,567 B2 * | 6/2005 | Van Den Goor | 198/370.02 |
| 7,198,145 B1 | 4/2007 | Brown et al. | |
| 7,240,781 B2 * | 7/2007 | Ramaker et al. | 198/370.02 |
| 7,357,242 B2 * | 4/2008 | Enomoto | 198/370.02 |
| 7,530,441 B2 * | 5/2009 | Zimmer | 198/370.02 |
| 7,628,265 B2 | 12/2009 | Verploegen et al. | |
| 8,459,440 B2 * | 6/2013 | Onayama | 198/370.02 |
| 2009/0139834 A1 | 6/2009 | Brayman et al. | |

OTHER PUBLICATIONS

European Search Report issued on Jun. 3, 2013 in corresponding European Application No. 13156876.8-1707.
Tolerances and Fits; mitcalc.com website, original date unknown.

* cited by examiner

*Primary Examiner* — Douglas Hess
(74) *Attorney, Agent, or Firm* — Harness, Dickey & Pierce, P.L.C.

(57) ABSTRACT

A shoe sorter switch for a conveyor includes a main body member positioned relative to the conveyor away from contact with any passing shoe of the conveyor. A plurality of subcomponents are mounted to the main body member and positioned to contact and direct passing shoes of the conveyor. The main body member and each of the plurality of subcomponents together define a plurality of precision fit couplings that each comprise a precision protrusion that is fit into a corresponding precision aperture. Related methods for assembling and installing the switch, including replacing damaged switch subcomponents without the need for any calibration to adjust the position of the replacement subcomponent relative to the main body member and to the conveyor are also provided.

24 Claims, 6 Drawing Sheets

SHOE SORTER CONVEYOR SWITCH AND METHOD

FIELD

The present disclosure relates to a shoe sorter conveyor, and particularly switches and related methods for selectively guiding the shoes.

BACKGROUND

This section provides background information related to the present disclosure which is not necessarily prior art.

A shoe sorter is a type of sorter conveying system composed of a conveyor which moves in a conveying direction along a conveying route. Mounted on the conveyor are pusher shoes which are movable relative to the conveyor in a direction transversely relative to the conveying direction. Each shoe is coupled to a guide pin or wheel which can engage features of a guide track mounted beneath the conveying surface managing the lateral position of the shoe relative to the conveyor surface. The guide rail arrangement includes switches which can divert or facilitate the travel direction of the guide pin or wheel from the conveying direction to a direction oriented transversely relative to the conveying direction. In that fashion, the shoes can push items transversely from the conveyor and onto a chute at appropriate destination sites along the conveying route. Examples of such sorter conveying systems include U.S. Pat. No. 4,738,347 issued to Brouwer et al on Apr. 19, 1988, U.S. Pat. No. 5,333,715 issued to Sapp on Aug. 2, 1994, and U.S. Pat. No. 5,613,591 issued to Heit et al. on Mar. 25, 1997, which are each incorporated herein by reference.

Damage to a switch can occur as a result of shoe guide pin or wheel impacting against the switch. Typically, however, the switch is comprised of a large, single part main body. When the damage occurs to this large, single part main body, then the entire main body must be replaced. This can result in substantial unnecessary material waste and costs. It is also typical that the switch is mounted in position using conventional clearance fit apertures through which bolts are fastened. This can be desirable in order to allow some adjustment of the switch when it is positioned to minimize any misalignments. Unfortunately, this can make it necessary for the installer replacing any damaged switch or component to need to finely tune the position of the replacement switch or component, which requires time and skill that ultimately reduces efficiency and increases costs and downtime.

SUMMARY

This section provides a general summary of the disclosure, and is not a comprehensive disclosure of its full scope or all of its features.

In one aspect of the disclosure, a shoe sorter switch for a conveyor includes a main body member positioned relative to the conveyor away from contact with any passing shoe of the conveyor. A plurality of subcomponents are mounted to the main body member and positioned to contact and direct passing shoes of the conveyor. The main body member and each of the plurality of subcomponents together define a plurality of precision fit couplings that each comprise a precision protrusion that is fit into a corresponding precision aperture.

In another aspect of the disclosure, a shoe sorter switch for a conveyor includes a main body member positioned relative to the conveyor away from contact with any passing shoe of the conveyor. The main body member comprises a plurality of precision fit apertures. A plurality of subcomponents are mounted to the main body member and positioned to contact and direct passing shoes of the conveyor. Each subcomponent comprised a plurality of precision fit protrusions extending past a mating face of the subcomponent. Each precision fit protrusion mates into a corresponding one of the precision fit apertures to form a precision fit coupling between the main body member and each subcomponent In yet another aspect of the disclosure, a method of assembling a shoe sorter switch for a conveyor includes coupling a main body member to the conveyor into a position relative to the conveyor away from contact with any passing shoe of the conveyor. Mounting a plurality of subcomponents to the main body member into a position that the subcomponents can engage and direct passing shoes of the conveyor is also included. Mounting each of the plurality of subcomponents to the main body member further includes creating a plurality of precision fit couplings for each subcomponent, wherein creating each precision fit coupling comprises mounting a precision protrusion into a corresponding precision aperture.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are disclosed herein, including numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Similarly, the use of "at least" one, two, or more in some cases herein does not mean that in other cases where the "at least" is not found the language somehow excludes the at least one, two or more option which is inherent in such terms as "comprises," "comprising," "including," "having," etc. In addition, the use of the term "each" herein in some cases does not necessarily mean in every instance, simply in every instance of those being discussed. For example, when a "plurality of" parts is described herein, followed by a description of "each" of those parts, then only each of the specified "plurality of" parts need to be as described, not additional ones of those parts that are not within an identifiable "plurality of" parts.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
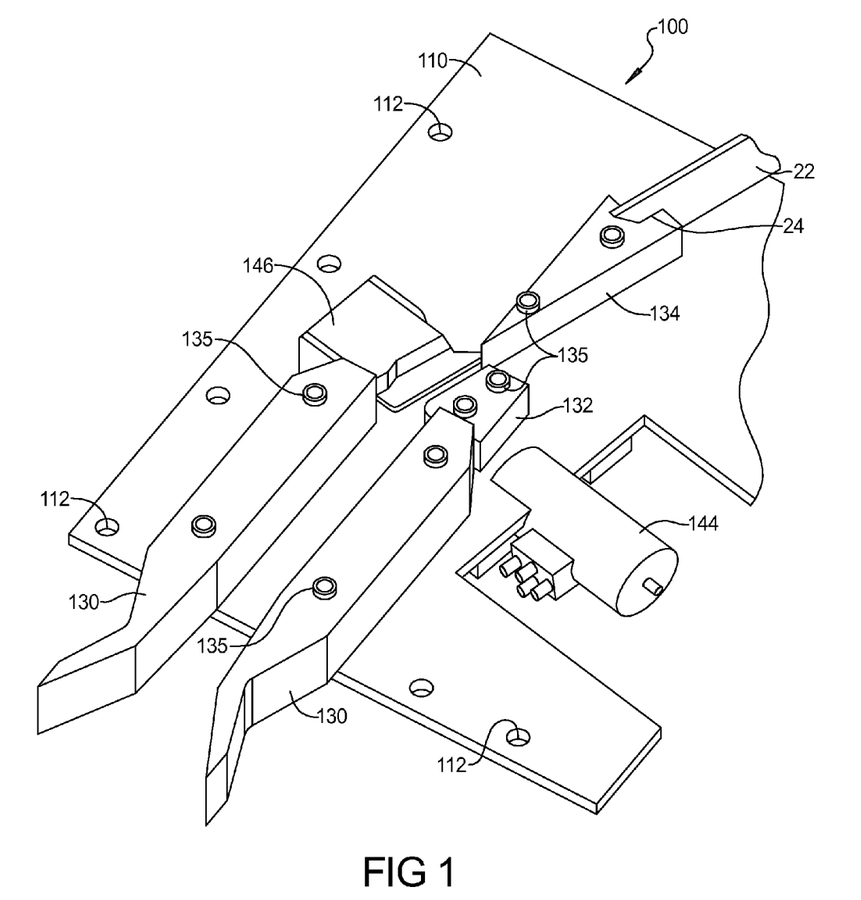
FIG. 1 is a perspective view of a first embodiment of a switch in accordance with the present disclosure in the form of a lateral switch.
Figure 2A:
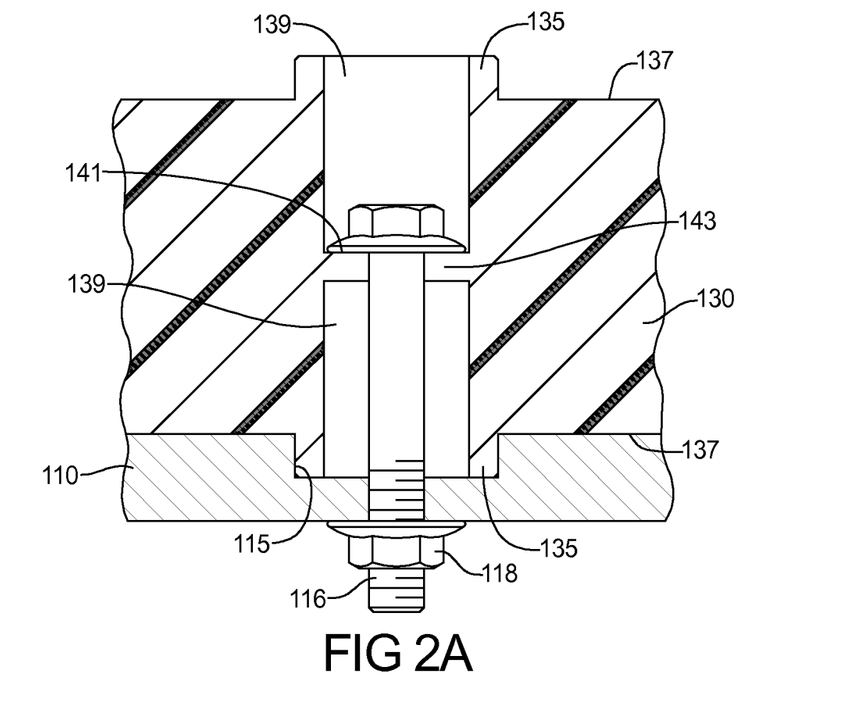
FIG. 2A is a partial cross-sectional view of an exemplary precision fit coupling of FIG. 1.

Referring to FIGS. 1-2A, an exemplary switch embodiment of this disclosure is provided as a lateral switch 100. The lateral switch 100 includes a main body member 110 which can be in the form of a flat metal plate. Main body member 110 is coupled to the conveyor 20 (FIG. 5) in a position relative to the conveyor 20 so that the passing shoes of the conveyor 20 will not contact the main body member 110. This can help insure the main body member 110 will not be damaged during normal operation of the conveyor 110 in any way that would require its replacement.

The main body member 110 can include apertures 112 through which bolts 114 (FIG. 5) or other fasteners extend to couple the main body member 110 to the conveyor 20. The apertures 112 can be conventional clearance fit apertures, or enlarged apertures; for example, having an elongated shape. This allows the location of the main body member 110 to be calibrated so that the assembled switch can be adjusted and precisely positioned relative to the conveyor 20 during installation. Similar apertures 112 can be provided for coupling the guide rails 22 to the main body member, so they can likewise be calibrated so that the guide rails 22 can be adjusted and precisely positioned relative to the assembled switch 100.

Coupled to the main body member 110 are a plurality of switch subcomponents 130, 132, and 134. In this embodiment, the lateral switch subcomponents 130, 132, and 134 include a pair of locating guide members 130 that have a height sufficient to engage the wheel of passing shoes. In other words, these locating guide members 130 have a wheel height. The guide locating guide members 130 are mirror image subcomponents so that a single molded subcomponent 130 can be coupled to the main body member 110 along a first side to form the left guide member, or can be coupled to the main body member 110 along the opposite side to form the right guide member.

The lateral switch subcomponents 130, 132, and 134 also include a triangular guide 134 and an anti-bounce member 132. Each of the triangular guide 134 and anti-bounce member 132 subcomponents have a height that is only sufficient to engage the guide pin of passing shoes. In other words, the triangular guide 134 and anti-bounce member 132 subcomponents have a guide pin height. This guide pin height is not sufficient to engage the wheel of passing shoes. The guide rails 22 have a wheel height and can engage into guide rail notches 24 provided in the various subcomponents.

What is specifically illustrated in FIGS. 1-2A is a lateral switch 100 for use on a left side of the conveyor 20 when facing in the conveying direction. It should be appreciated that a mirror lateral switch 100 can be located on the right side of the conveyor 20. As such, a single molded triangular guide 134 subcomponent can be coupled to the main body member 110 of a left-side lateral switch 100 along a first side of the triangular guide member 134 to form the triangular subcomponent for such a left-side lateral switch, or can be coupled to the main body member 110 of a mirror right-side lateral switch 100 along the opposite side of the triangular guide member 134 to form the subcomponent for such a right-side lateral switch 100.

As such each of the subcomponents 130, 132, and 134 is molded to potentially operate as one of two mirror subcomponents, depending upon which of the two opposite sides 137 of the subcomponent 130, 132, and 134 is coupled against the main body member 110. This means that each of the opposite sides 137 of each subcomponent 130, 132, and 134 includes a set of protrusions 135 that extend past the coupling side or face that engages against the corresponding coupling side or face of the main body member, and that mirror the set of protrusions 135 on the opposite sides 137 of each subcomponent 130, 132, and 134.

Each subcomponent 130, 132, and 134 can include at least two precision fit protrusions 135 on the coupling side or face 137 thereof. Each precision fit protrusion 135 is positioned into a corresponding precision fit aperture 115 in the main body member. In this manner, each precision fit protrusion 135 and corresponding precision fit aperture 115 can form a precision fit coupling that precisely locates each subcomponent 130, 132, and 134 in correct position in relation to the main body member 110 and other subcomponents of the switch 110, without the need for any calibration adjusting the precise position of the subcomponents during assembly of the switch 110.

A "precision fit coupling" is defined herein in reference to a "clearance fit" coupling. "Clearance fit" couplings are well-known standard couplings used for example in bolting one item to another and has a fit that typically provides a clearance between the aperture and protrusion of the coupling, which occurs because the lower tolerance limit size of the aperture is greater than or equal to the upper tolerance limit size of the protrusion. In contrast, a "precision fit coupling" has a fit that typically provides some interference between the aperture and protrusion of the coupling, because the tolerance zone of the aperture and the tolerance zone of the protrusion overlap (sometimes referred to as a "transition fit"). A "precision fit coupling" might preferably be a coupling that always ensures there is some interference between the aperture and the protrusion, because the upper limit of size of the aperture is equal to or less than the lower limit size of the protrusion (sometimes referred to as an "interference fit").

Figure 2B:
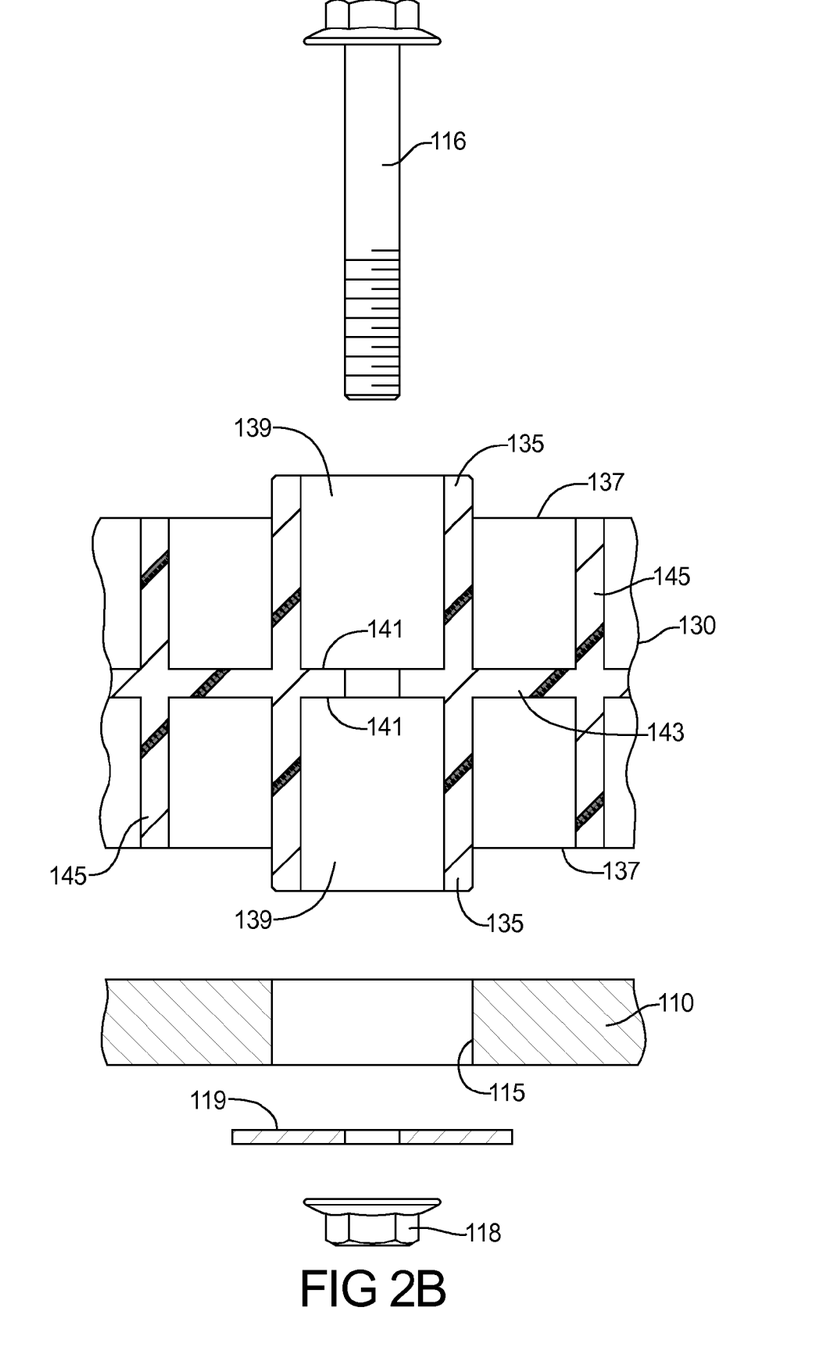
FIG. 2B is a partial cross-sectional view similar to FIG. 2A of an alternative precision fit coupling.

Referring to FIGS. 2A and 2B, two alternative embodiments showing precision coupling components are provided. The main differences are that in FIG. 2A, the precision fit protrusion 135 extends from a side or face 137 of a subcomponent 130, 132, and 134 with a solid plastic body, while in FIG. 2B the precision fit protrusion 135 extends from a face or side 137 of a subcomponent 130, 132, and 134 that has a honeycomb structure. Further, in FIG. 2A the precision fit aperture 115 only extends partially through the main body member 110, while in FIG. 2B the precision fit aperture 115 extends completely through the main body member 110.

With continuing reference to FIGS. 2A and 2B, at least one bolt 116 or other fastener can be provided through each subcomponent 130, 132, or 134 to retain the precision fit couplings formed with each precision fit protrusion 135 and corresponding precision fit aperture 115. In these embodiments, each precision protrusion 135 has an annular cross-section, with a bolt 116 extending through an opening 139 through the subcomponent 130, 132, and 134 and defined near its end by the annular precision protrusion 135. The bolt 116 can further extend through the middle of the precision aperture 115 with a nut 118 affixed thereto to retain the subcomponent 130, 132, or 134 and switch main body member 110 together. In FIG. 2B, a washer 119 is included and the solid body of the subcomponent 130, 132, and 134 is replaced by an extension of the central web 143 and vertical ribs 145 providing a honeycomb configuration body structure.

The head of the bolt 116 can engage a shoulder 141 formed by a central web material 143 centrally positioned within the opening 139 through the subcomponent 130, 132, or 134. The central web material 143 can form two opposite-facing shoulders 141 for enabling either of the opposite sides 137 with the protrusions 135 to be coupled against the main body member 110 when any subcomponent 130, 132, and 134 is designed to operate as mirror subcomponents.

Referring to FIGS. 1-2B, this lateral switch 100 also includes an actuator 144 coupled to a pivoting member 146. When the pivoting member 146 is in the down position, the shoes pass through the lateral switch 100 without traversing laterally across the conveyor 20 along the guide rails 22. When the pivoting member 146 is in the up position it engages the wheel of a passing shoe causing the pin to engage along the right side of the triangular member 134 until the wheel picks up the guide rail 22.

Figure 3:
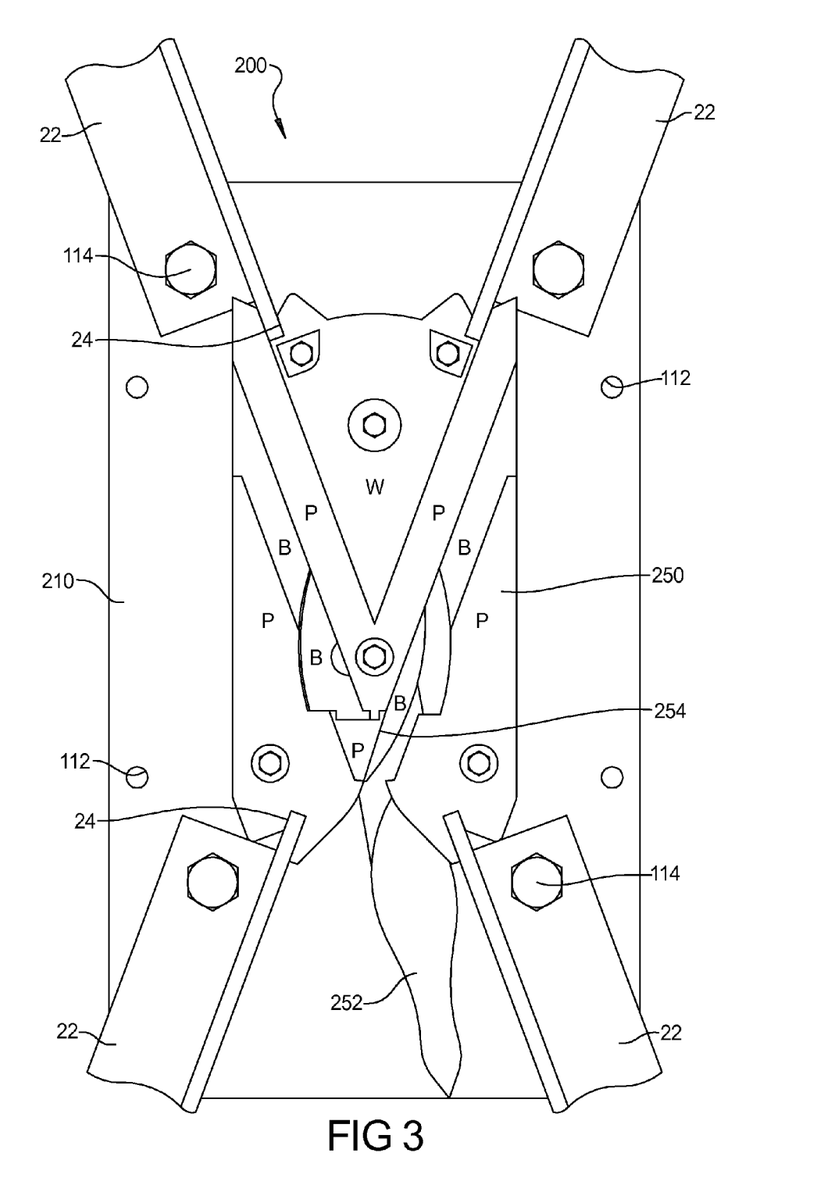
FIG. 3 is a perspective view of a second embodiment of a switch in accordance with the present disclosure in the form of a center switch.
Figure 4:
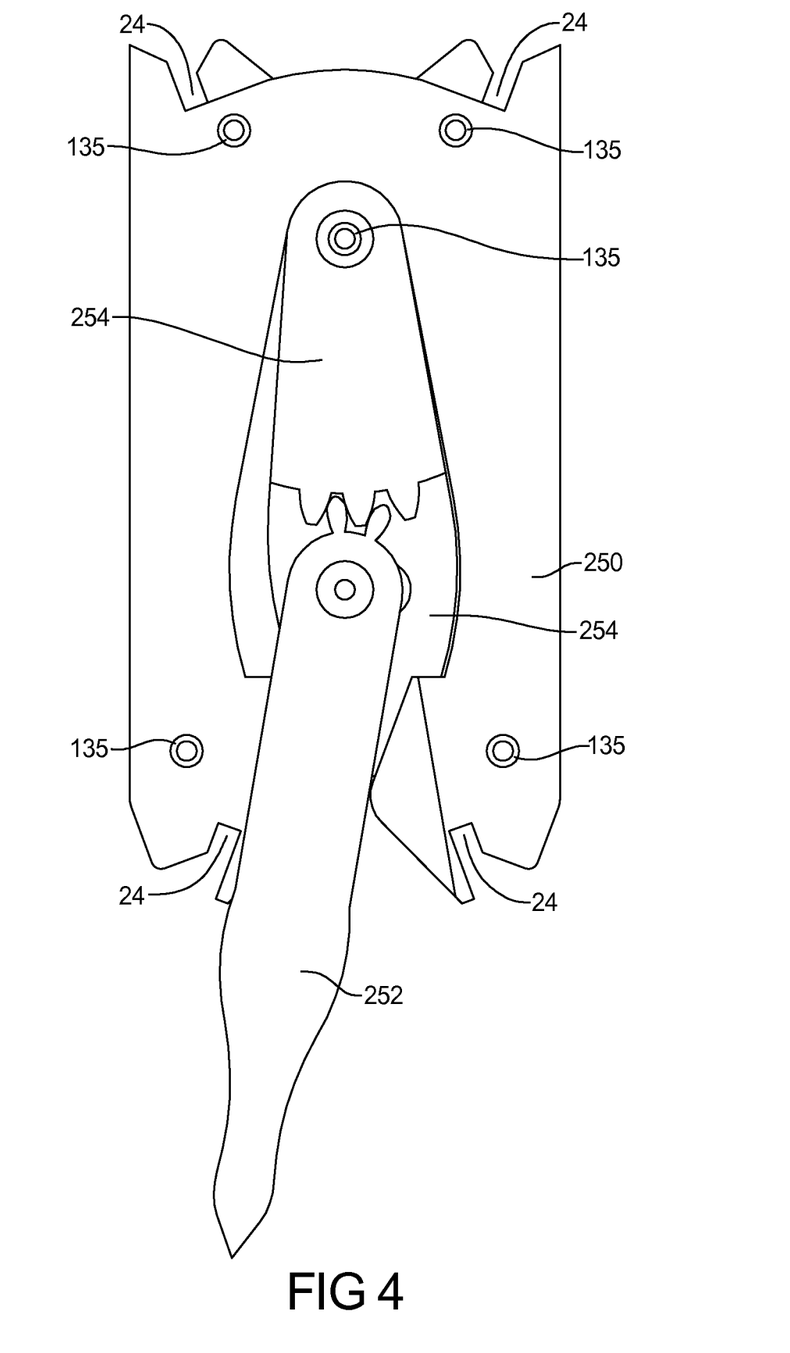
FIG. 4 is a perspective view of exemplary plastic components of the switch of FIG. 3.

Referring to FIGS. 3-4, another exemplary switch embodiment of this disclosure is provided as a center switch 200. The center switch 200 of this embodiment does not alter the direction that a shoe is traveling in, but instead provides crisscrossing guide paths to continuously guide passing shoes, regardless of which direction they are traveling.

This embodiment includes a main body member 210 in the form of a flat steel plate. To aid in the understanding of the various guide features of the switch, the areas having a height sufficient to engage the wheel of a shoe are identified with a W, while the areas of the switch having a height sufficient only to engage a guide pin of a shoe are identified with a P, and the areas of the switch that are below even the guide pin are identified with a B. As with the prior embodiment, the flat steel plate 210 includes a plurality of precision fit apertures 115 for engaging the precision fit protrusions 135 on the main subcomponent 250. When assembled together each precision fit protrusion 135 from the main subcomponent 250 fits into one of the precision fit apertures 115 of the flat steel plate 210 to form a precision fit coupling (exemplified in FIGS. 2A and 2B). In this way, the position of the main subcomponent 250 is precisely located relative to the main body member 210 flat plate.

The main body member 210 can additionally include a plurality of clearance fit apertures 112 for use in coupling the main body member 210 to the conveyor 20. Thus, the main body member 210, and therefore the center switch 200, can be calibrated by adjusting the precise position thereof in relation to the conveyor 20. The main body member 210 can further include a plurality of clearance fit apertures 112 for use in coupling the guide rails 22 to the main body member 210. Thus, the position of the guide rails 22 can be slightly adjusted in relation to the center switch 210 to allow the position of the guide rails 22 to be calibrated relative to the center switch 210 including cooperating notches 24.

Coupled to the main subcomponent 250 of the center switch 200 is a movable lever 252 engaged with a movable guide 254 using a gear arrangement. Thus, regardless of which direction a shoe is traveling in, the shoe will first engage the movable lever 252, which will position the movable guide 254 in the correct position to insure the shoe is continuously guided by the center switch 200 via contact at all times with at least one of the guide pin or wheel of the shoe.

Figure 5:
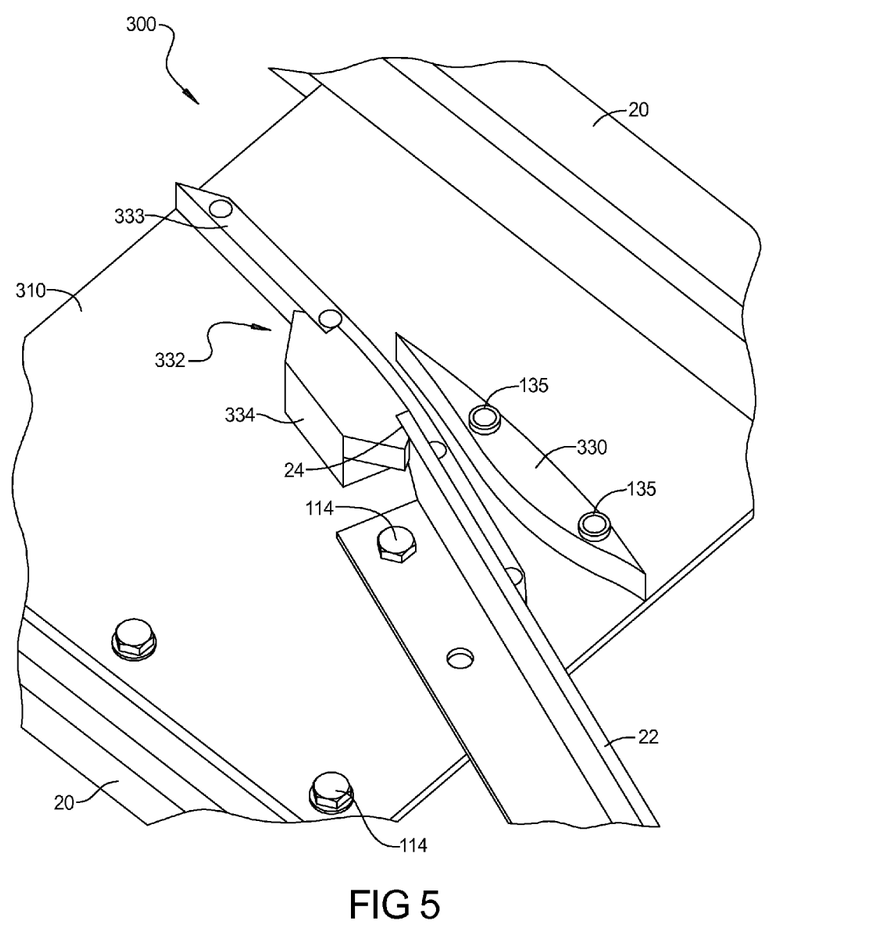
FIG. 5 is a perspective view of a third embodiment of a switch in accordance with the present disclosure in the form of a receiver.

Referring to FIG. 5, another exemplary switch embodiment of this disclosure is provided as a receiver 300. The receiver 300 can help slow the speed of the shoe, but importantly redirects the shoe along less steep angular path relative to the side of the conveyor 20.

The receiver 300 of this embodiment can include two subcomponents 330 and 332 that include precision fit protrusions 135. When subcomponent 332 is further made of two subcomponents 333 and 334, then both subcomponents 330 and 332 can be designed as a mirror component that each include precision fit protrusions 135 on opposing sides thereof as exemplified with reference to FIGS. 2A and 2B. In this manner these subcomponents 330 and 333 can be used for receivers mounted on either the left or right side of the conveyor. Alternatively, subcomponent 332 can be molded as a one piece plastic member including subcomponents 333 and 334, that is not designed as a mirror subcomponent, and therefore is not reversible.

As already discussed above regarding the other switches in reference to FIGS. 2A and 2B, the precision fit protrusions 135 mate with precision fit apertures 115 of the main body member 310, to form a precision fit coupling. This precision fit coupling enables the subcomponents 330 and 332 to be precisely located relative to the main body member 310 without the need to calibrate the two together when they are being coupled together, as would otherwise be required.

Also as discussed above regarding the other switches, the main body member 330 can include clearance fit apertures 112 that allow the main body member 330 to be calibrated into position relative to the conveyor 20 when it is coupled thereto. Clearance fit apertures 112 are also provided in the main body member to allow the guide rails 22 to be calibrated into precise position when they are coupled to the receiver switch 300, which can include cooperating notches 24.

As further discussed above relative to the lateral switch 100, a receiver 300 can be located on the right side of the conveyor 20 as seen in FIG. 5, and a mirror receiver 300 can be located on the left side of the conveyor 20. Thus, any mirror subcomponents 330 and 333 of the receiver 330 can include opposite sides or faces 137 which the precision protrusions 135 extend past from and into precision apertures 115 in the main body member 310 to form precision couplings similar to that exemplified in FIGS. 2A and 2B.

It should be apparent from the above description, that another embodiment of the switch of this invention can include a plurality of switches, that can include for example one, two, or more lateral switches 100 such as described above in reference to FIGS. 1-2, and one, two, or more receivers 300 such as described above in reference to FIG. 5. Yet another embodiment of the switch of this invention can include a plurality of switches, that can include for example, one, two, or more lateral switches 100 such as described above in reference to FIGS. 1-2, one, two, or more center switches 200 such as described above in reference to FIGS. 3-4, and one, two, or more receivers 300 such as described above in reference to FIG. 5.

Installing the switches 100, 200, 300 can include calibrating the position of the main body members 110, 210, and 310 relative to the conveyor 20. This can be accomplished, for example, by providing clearance fit couplings between the main body members 110, 210, and 310 and the conveyor 20. The main body members 110, 210, and 310 can be positioned relative to the conveyor 20 so that they do not come into contact with passing shoes. As such they are not subject to being damaged during normal operation of the conveyor by the passing shoes.

Assembling the switches 100, 200, 300 can include selecting which of two opposing sides 137 or faces of a subcomponent to mount to the main body member 110, 210, and 310. The selection can be dependent on the position on a main body member 110, 210, and 310 that the subcomponent will occupy. The selection can also be dependent upon whether the switch 100, 200, 300 will be used on the right or left side of the conveyor 20. In such cases, the subcomponents can be formed of plastic molded parts that have been designed as mirror subcomponents. One plastic that has been found to meet the requirements for the subcomponents is a toughened, lubricated nylon plastic. An example of one such plastic is commercially available from Techmer Lehvoss Compounds, LLC under the tradename Luvotech™ and identified as Super Tough Nylon 66, $MoS_2$ filled.

Since the shoes engage and contact against the various subcomponents of the switch 100, 200, and 300 during operation of the conveyor 20, the subcomponents can become damaged during operation of the conveyor 20. Thus, when replacing a damaged subcomponent there is no need to replace all of the parts that come into contact with the passing shoes. Only the damaged subcomponent needs to be replaced. Further, there is no need for any calibration or adjustment of the position of the subcomponents relative to the main body member 110, 210, and 310, respectively, when replacing any damaged subcomponent or otherwise assembling the switch 100, 200, and 300.

Assembling the switch 100, 200, and 300 or replacing a damaged subcomponent can include creating a plurality of precision fit couplings for each subcomponent, wherein creating each precision fit coupling comprises mounting a precision protrusion 135 into a corresponding precision aperture 115. In addition, the precision fit protrusion 135 can be molded with an annular cross-sectional shape. A bolt 116 can be provided through an opening 139 defined by the annular cross sectional protrusion 135, and through the aperture 115 in the main body member 110, 210, and 310, respectively, where it can be attached to a nut 118 to retain the subcomponent and main body member together.

The guide rails 22 can also be coupled to the main body members 110, 210, and 310. This coupling can be accomplished by providing clearance fit couplings between the switch main body 110, 210, and 310 and the guide rails 22 using clearance fit apertures 112 and bolts 114, which can include positioning the end of the guide rail 22 in a cooperating notch 24 of a subcomponent.

The foregoing description of the embodiments has been provided for purposes of illustration and description. It is not intended to be exhaustive or to limit the disclosure. Individual elements, features, or steps of a particular embodiment are generally not limited to that particular embodiment, but, where applicable, are interchangeable and can be used in other embodiments, even if the resulting combination is not specifically illustrated or described herein. The same may also be varied in any way as to the inclusion, or not, of other individual elements, features, or steps. In addition, the method steps, processes, and operations described herein are not to be construed as necessarily requiring their performance in the particular order discussed or illustrated, unless specifically identified as an order of performance. Any such and similar variations are not to be regarded as a departure from the disclosure, and all such modifications are intended to be included within the scope of the disclosure.

What is claimed is:

1. A shoe sorter switch for a conveyor comprising:
a main body member positioned relative to the conveyor away from contact with any passing shoe of the conveyor;
a plurality of subcomponents mounted to the main body member and positioned to contact and direct passing shoes of the conveyor;
wherein the main body member and each of the plurality of subcomponents together define a plurality of precision fit couplings that each comprise a precision protrusion that is fit into a corresponding precision aperture; and
wherein at least one of the subcomponents includes the precision fit protrusion or the corresponding precision aperture of each precision fit coupling on first and opposing coupling faces of the at least one subcomponent so the subcomponent is reversible to form a mirror component depending upon whether it is coupled against the first coupling face or the opposing coupling face.

2. The shoe sorter switch of claim 1, further comprising a clearance fit coupling mounting the main body member into position relative to the conveyor.

3. The shoe sorter switch of claim 1, further comprising a clearance fit coupling mounting a guide rail of the conveyor to the main body member.

4. The shoe sorter switch of claim 1, wherein each of the plurality of precision protrusions has an annular cross-sectional shape, and further comprising a bolt extending through an opening defined by the annular cross-sectional shape of each of the plurality of precision protrusions to retain each of the plurality of precision fit couplings together.

5. The shoe sorter switch of claim 1, wherein each of the plurality of precision protrusions is an integral one-piece component of the respective subcomponent extending into the corresponding precision aperture which is formed in the main body member.

6. The shoe sorter switch of claim 5, wherein the shoe sorter switch comprises a plurality of shoe sorter switches including a lateral switch and a receiver.

7. The shoe sorter switch of claim 5, wherein the shoe sorter switch comprises a plurality of shoe sorter switches including a lateral switch, a center switch, and a receiver.

8. The shoe sorter switch of claim 5, wherein the main body member is a substantially planar metal plate, and wherein each of the plurality of subcomponents is a plastic molded part.

9. The shoe sorter switch of claim 5, wherein each of the plurality of subcomponents is a toughened, lubricated nylon plastic molded part.

10. A shoe sorter switch for a conveyor comprising:
a main body member positioned relative to the conveyor away from contact with any passing shoe of the conveyor, and the main body member comprising a plurality of precision fit apertures;
a plurality of subcomponents mounted to the main body member and positioned to contact and direct passing shoes of the conveyor, and each subcomponent comprising a plurality of precision fit protrusions extending past a mating face of the subcomponent;
wherein each of the plurality of precision fit protrusions mates into a corresponding one of the plurality of precision fit apertures to form a precision fit coupling between the main body member and each subcomponent;
wherein at least one of the plurality of subcomponents comprises a first set of protrusions extending past a first mounting face on a first side of the at least one subcomponent and an opposing plurality of protrusions extending past an opposite mounting face on an opposite side of the at least one subcomponent, and
wherein the at least one subcomponent can form a part of the switch when mounted to the main body member along the first mounting face, and is reversible to form a mirror switch component when mounted along the opposite mounting face of the subcomponent.

11. The shoe sorter switch of claim 10, wherein each of the plurality of precision fit protrusions comprises an annular cross-sectional shape.

12. The shoe sorter switch of claim 11, wherein each of the plurality of precision fit couplings further comprises a bolt extending through a central opening defined by the cross-sectional shape to couple each of the plurality of subcomponents to the main body member.

13. The shoe sorter switch of claim 10, comprising a plurality of shoe sorter switches, wherein a first of the shoe sorter switches is a lateral switch, and second of the shoe sorter switches is a center switch, and second of the shoe sorter switches is a receiver.

14. The shoe sorter switch of claim 10, comprising a plurality of shoe sorter switches, wherein a first of the shoe sorter switches is a switch type selected from one of a lateral switch, a center switch, and a receiver, and wherein a second of the shoe sorter switches is a different one of the switch types.

15. The shoe sorter switch of claim 10, wherein each of the plurality of subcomponents is a toughened, lubricated nylon plastic molded part.

16. A method of assembling a shoe sorter switch for a conveyor comprising:
coupling a main body member to the conveyor into a position relative to the conveyor away from contact with any passing shoe of the conveyor;
mounting a plurality of subcomponents to the main body member into a position that the subcomponents can engage and direct passing shoes of the conveyor;
wherein mounting each of the plurality of subcomponents to the main body member further comprises creating a plurality of precision fit couplings for each subcomponent, wherein creating each precision fit coupling comprises mounting a precision protrusion into a corresponding precision aperture;
unmounting one of the subcomponents from the main body that has been damaged through contact with the passing shoes of the conveyor;
mounting a replacement subcomponent to the main body comprising creating a plurality of precision fit couplings for the replacement subcomponent, wherein each of the plurality of precision fit couplings comprises mounting a precision protrusion into a corresponding precision aperture; and
wherein replacing the damaged subcomponent with the replacement subcomponent does not require any recalibration of the position of the main body or of the replacement subcomponent.

17. The method of assembling a shoe sorter switch of claim 16, further comprising:
designing at least one of the subcomponents to be reversible depending upon whether it is coupled against a first coupling face, or an opposing coupling face; and
selecting one of the opposing sides to mount against the main body.

18. The method of assembling a shoe sorter switch of claim 16, wherein coupling the main body member to the conveyor further comprises calibrating the position of the main body member.

19. The method of assembling a shoe sorter switch of claim 16, further comprising coupling a guide rail to the main body member and calibrating the position of the guide rail during the coupling operation.

20. The method of assembling a shoe sorter switch of claim 16, further comprising providing at least one subcomponent with a plurality of precision protrusions extending past a mounting face on a first side of the subcomponent and an opposing plurality of protrusions extending past an opposing mounting face on an opposing side of the subcomponent.

21. The method of assembling a shoe sorter switch of claim 16, wherein the method is used to assemble each of a lateral switch and a receiver.

22. The method of assembling a shoe sorter switch of claim 16, wherein the method is used to assemble each of a lateral switch, a receiver, and a center switch.

23. The method of assembling a shoe sorter switch of claim 22, further comprising providing at least one subcomponent with first set of precision protrusions extending past a mounting face on a first side of the subcomponent and an opposing set of protrusions extending past an opposing mounting face on an opposing side of the subcomponent; and     selecting to mount the at least one subcomponent along the first side when it is being used in a first position for one of the lateral switch, the receiver, and the center switch, or selecting to mount the at least one subcomponent along the opposing side when it is being used as a mirror subcomponent in a second position for one of the lateral switch, the receiver, and the center switch.

24. The method of assembling a shoe sorter switch of claim 16, further comprising molding each of the plurality of subcomponents from a toughened, lubricated nylon plastic.

\* \* \* \* \*